Oct. 14, 1941.　　　　S. B. CRARY　　　　2,259,125
REGULATOR SYSTEM
Filed Aug. 10, 1940　　　　2 Sheets-Sheet 1

Inventor:
Selden B. Crary,
by Harry E. Dunham
His Attorney.

Oct. 14, 1941.　　　　S. B. CRARY　　　　2,259,125
REGULATOR SYSTEM
Filed Aug. 10, 1940　　　　2 Sheets-Sheet 2

Inventor:
Selden B. Crary,
by　Harry E. Dunham
His Attorney.

Patented Oct. 14, 1941

2,259,125

UNITED STATES PATENT OFFICE 2,259,125

REGULATOR SYSTEM

Selden B. Crary, Schenectady, N. Y., assignor to General Electric Company, a corporation of New York Application August 10, 1940, Serial No. 352,103

2 Claims. (Cl. 171—119)

This invention relates to regulator systems and more particularly to a regulator system for improving the stability of synchronous generators.

It is customary to provide synchronous generators or alternators with automatic voltage regulators. These regulators automatically increase the excitation when the voltage drops below normal until the voltage is brought back to normal and conversely they decrease the excitation so as to lower the voltage to normal in case the voltage rises. An increase in the kilowatt load on an alternator tends to reduce its voltage and the increase in excitation caused by the regulator in response to the decrease in voltage not only tends to restore the voltage to normal but also tends to stabilize the alternator and prevent it from pulling out of step or losing synchronism. However, there are other factors, such as reactive or wattless power, which also effect the alternator voltage, so that sometimes an increase in kilowatt load will not decrease the alternator voltage. Under such circumstances the alternator may become unstable and pull out of synchronism. Consequently, an automatic voltage regulator is not a reliable stabilizer under all operating conditions. It has, therefore, been customary to employ larger alternators than would otherwise be necessary or to employ expensively designed alternators having what is known as a high short circuit ratio. Such machines are inherently more stable with respect to given load variations than is a machine having a lower short circuit ratio.

In order to permit the use of smaller machines or less expensively designed machines or both, I provide auxiliary means responsive to a function of the kilowatt load on the alternator for resetting or recalibrating the voltage regulator in such a manner as to stabilize the alternator.

An object of the invention is to provide a new and improved regulator system for synchronous dynamo-electric machines.

Another object of the invention is to provide an automatic system for adjusting the setting of an automatic voltage regulator for an alternator in such a manner as to prevent instability of the alternator.

The invention will be better understood from the following description taken in connection with the accompanying drawings and its scope will be pointed out in the appended claims.

Figure 1:
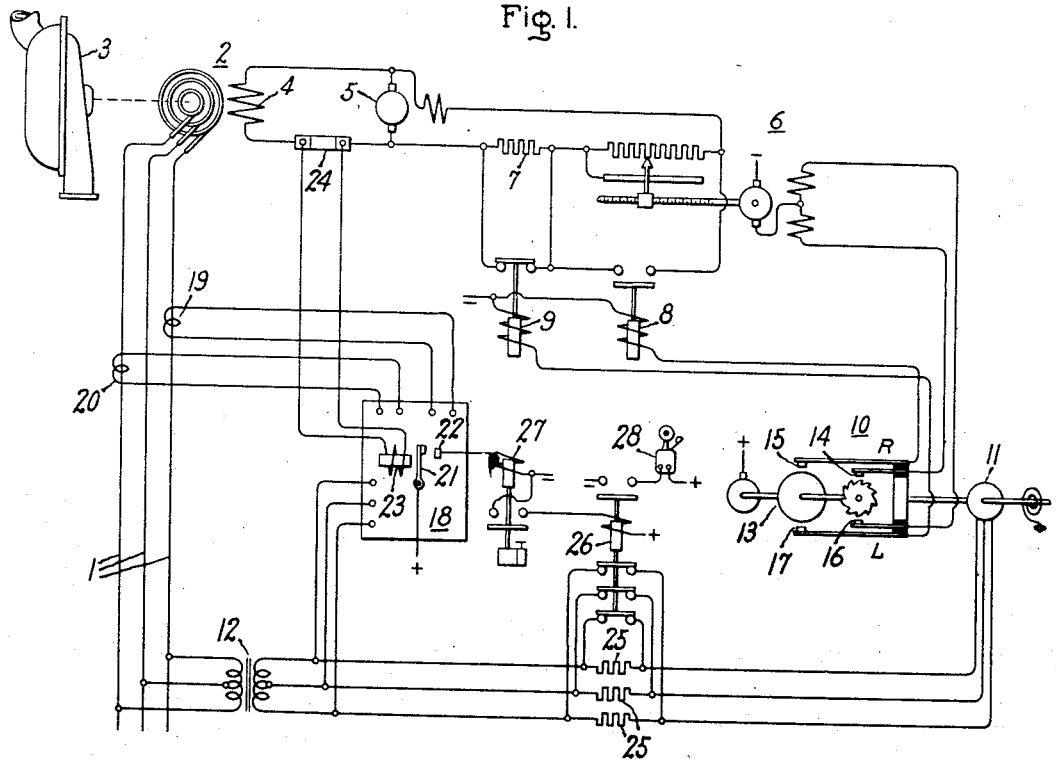
Figure 2:
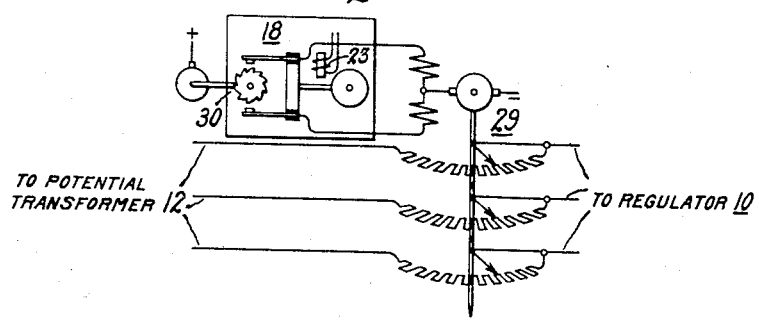
Figure 3:
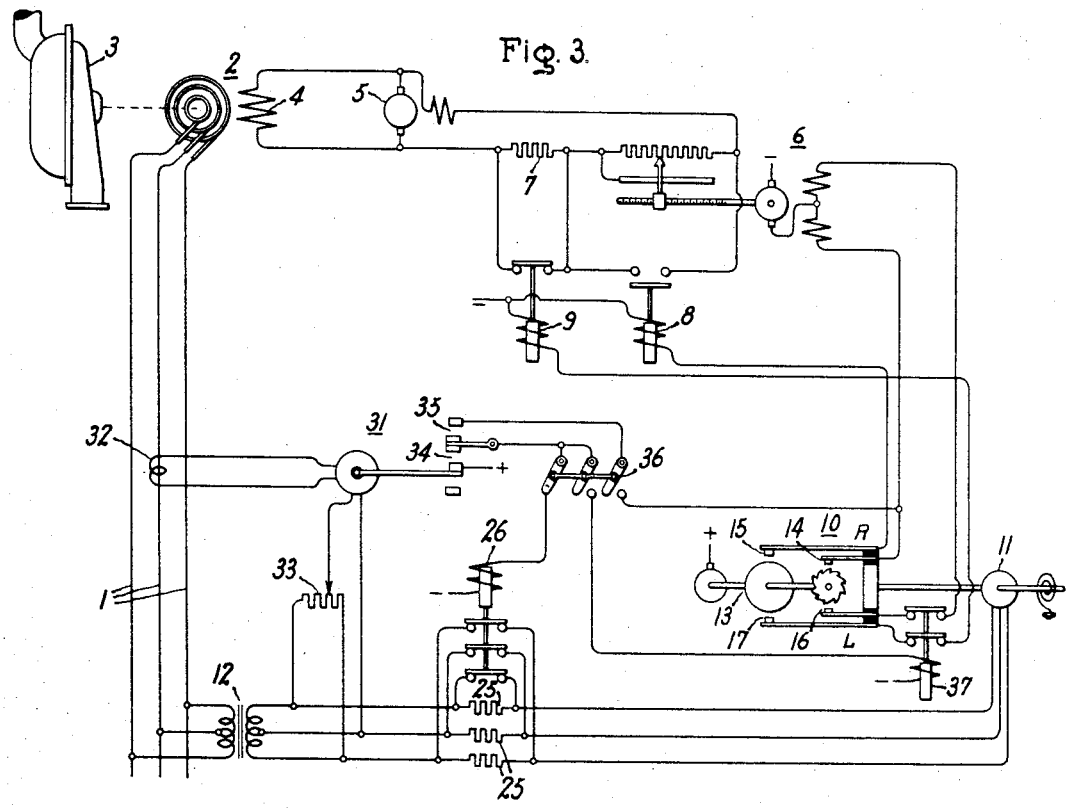
Figure 4:
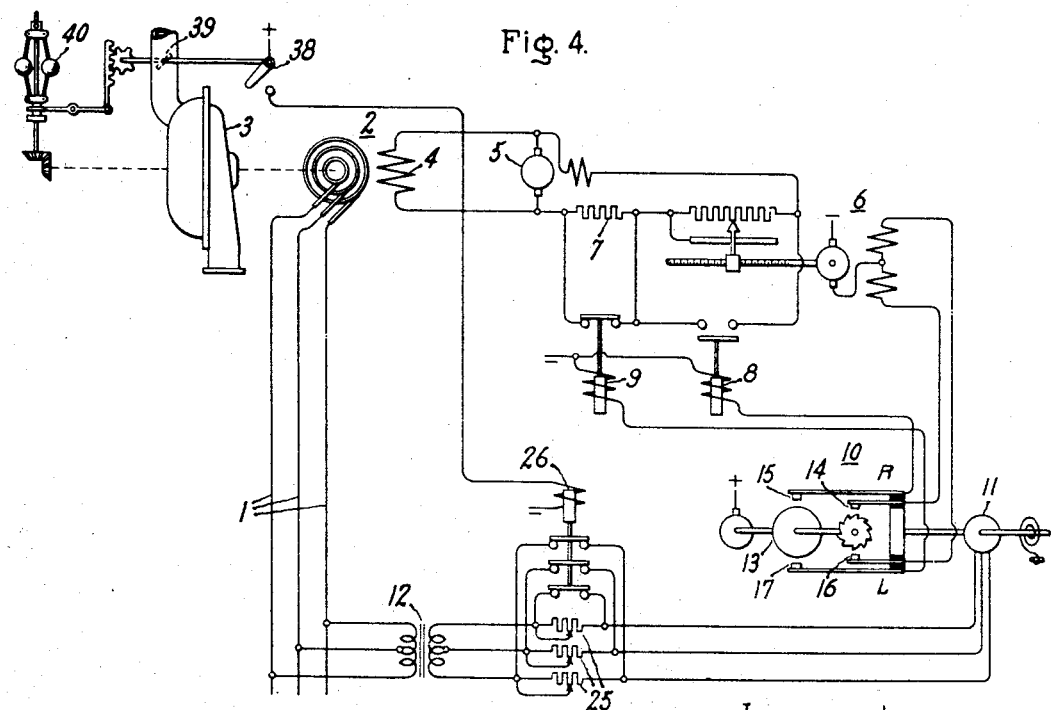

In the drawings, Fig. 1 illustrates diagrammatically a preferred embodiment of the invention; Fig. 2 is a modification thereof; Fig. 3 shows another species of the invention employing power factor response, and Fig. 4 illustrates still another species utilizing the prime mover inlet valve position for controlling the resetting of the voltage regulator.

Referring now to the drawings and more particularly to Fig. 1, there is shown therein a synchronous-to-synchronous system 1 including an alternator 2 driven by a prime mover 3. The alternator has a direct current field winding 4 energized by a shunt connected exciter 5 in whose field circuit is a motor-operated rheostat 6 and a fixed resistance 7. Arranged to short-circuit the rheostat 6 is a high speed excitation raising relay 8 and arranged to remove the normal short-circuit about the resistor 7 is a high speed excitation lowering relay 9.

The rheostat 6 and the high speed relays 8 and 9 are controlled by an automatic voltage regulator or voltage responsive controller 10 consisting of a torque motor 11 connected to respond to the voltage of the alternator 2 by means of a suitable potential transformer 12. This controller comprises a common center contact member 13 on opposite sides of which are a pair of raise contacts 14 and 15 and a pair of lower contacts 16 and 17. These contacts are so arranged that whenever the alternator voltage falls slightly below a predetermined normal value the torque motor will cause the raise contact 14, which is the slow speed raise contact, to engage the center contact thereby starting the motor-operated rheostat in such a direction as to decrease its resistance and raise the excitation, whereas if the voltage decreases by a relatively large amount the contact 15, which is the high speed raise contact, will be brought into engagement with the contact 13 thereby energizing the high speed raising relay 8 and short-circuiting the rheostat. Similarly, when the voltage exceeds normal, the slow speed lower contact 16 will cause energization of the rheostat and if the rise in voltage is large the high speed lower contact 17 will cause operation of the high speed lowering relay 9. In this manner the voltage of the alternator is maintained substantially constant.

For preventing the voltage regulator from permitting an unstable operating position of the alternator, I provide a wattmetric device 18 having current elements energized in response to the alternator current by means of current transformers 19 and 20 and having potential elements energized from the secondary windings of potential transformer 12. This wattmetric element has a movable contact carrying member 21 which is urged into engagement with a fixed contact 22 with a force proportional to the kilowatt load on the alternator. However, this motion of the movable element 21 is opposed by an electromagnet 23 energized in proportion to the current in the alternator excitation circuit. As shown, this result is accomplished by connecting the winding of the magnet 23 across a shunt 24 in circuit with the field winding 4 of the alternator.

I have found that over a wide range of kilowatt load the critical field current of an alternator below which the alternator is unstable and will pull out of step and above which the alternator is stable is substantially directly proportional to the kilowatt load under the condition of normal terminal voltage. This substantially straight line relationship holds good until the load approaches full load when it becomes affected by external system characteristics or the field current reaches such high values as to produce saturation effects. Normally, however, these secondary effects are not noticeable or can be compensated for in the adjustment. Consequently, the contact closing torque of the wattmeter 8 and the contact opening torque of the field current magnet 23 are so adjusted and proportioned that the contacts will remain open so long as the field current is above the minimum stability value for any normally valued load and the contacts will close when the field current closely approaches the minimum stability value. These contacts when they close are arranged to reset or recalibrate the voltage regulator so as to cause it to hold a higher level of voltage and thereby automatically increase the excitation to a safe value within the stable range. This resetting means is shown by way of example as a set of resistors 25 connected in series with the torque motor 11. These resistors are normally short-circuited by a relay 26 whose energization is controlled by a time delay relay 27 under the control of the contacts 21—22. A suitable alarm 28 is also controlled by the relay 26 so as to give a central station attendant a warning that the alternator voltage has been recalibrated because the alternator has been operating near the point of instability.

The operation of Fig. 1 has already been largely explained. The purpose of the time delay relay 27, which may be omitted if desired, is to prevent operation of the resetting means in response to transient variations in load or field current which might cause momentary closure of contacts 21 and 22. The functioning of the automatic regulator has already been explained in detail. The insertion of the resistors 25 in the control circuit of the regulator by means of the energization of the relay 26 in response to the closure of the contacts 21 and 22 causes the voltage regulator to act as though the voltage is lower than it really is by reason of the voltage drop in the resistors 25. Consequently, the regulator acts to increase the excitation. As soon as the excitation has been increased to a safe value from the point of view of stability the contacts 21 and 22 open thereby resetting the voltage regulator. Ordinarily, the change in excitation necessary to cause reopening of the contacts 21 and 22 will be relatively slight and will not be sufficient to raise the alternator voltage to a value outside of the normal band width or sensitivity of the voltage regulator so that there will be no conflict between the operation of the regulator control 10 and the field current biased wattmeter control 18.

If, however, it is desired to have such a small band width or sensitive setting of the regulator that the voltage regulator should attempt to reduce the excitation as soon as the contacts 21 and 22 reopen this can be eliminated by the modification shown in Fig. 2 in which a motor operated gang rheostat 29 is substituted for the resistors 25 and relay 26. In addition, the field current biased wattmetric controller is provided with contact assembly 30 similar to contacts 13, 14, and 16 of the voltage regulator. The arrangement is such that when the field current approaches the minimum value for stability at any load one set of contacts will engage and cause the motor-operated rheostat 29 to increase its resistance. As before, this will cause the voltage regulator to increase the field current and when the field current rises to a safe value the contacts will separate and the motor-operated rheostat 29 will stop. If then the load falls off or by reason of any other operating condition the field current becomes substantially higher than the minimum value necessary to maintain stability, the other set of contacts will engage, thereby reversing the rheostat 29 and lowering the setting of the regulator.

The operation of the contact 30 should preferably be slower than the operation of the voltage regulator so as to prevent hunting or conflicting operation. If desired, the rheostat 29 may be provided with conventional limit switches to prevent overtravel.

The band width setting of the contacts may be as wide as the voltage regulation requirements will permit so as to prevent unnecessarily frequency operation of rheostat 29.

In the modification shown in Fig. 3 a power factor relay 31 has been substituted for the field current biased wattmetric relay 18. This relay has a current element energized by a current transformer 32 and a potential element energized from the potential transformer 12. A rheostat 33 is provided for making adjustments in the setting of the relay. The relay is provided with a set of contacts 34 and a second set of contacts 35. The arrangement is such that whenever the power factor is lagging corresponding to a condition of over-excitation both sets of contacts are open. When the power factor tends to pass through unity in a direction from lagging to leading or when it decreases below a predetermined value in a leading direction thus indicating a condition of under-excitation, contacts 34 will first close and if the relative excitation decreases further the contacts 35 will close. A manual control switch 36 is provided for selectively permitting the power factor relay to reset the voltage regulator or to assume full control of the excitation independently of the voltage regulator. In the latter case an auxiliary relay 37 for opening the circuits of both the high speed and low speed lowering contacts 16 and 17 is provided.

The operation of Fig. 3 is the same as the operation of Fig. 1 so long as the alternator is over-excited or is not under-excited to such an extent as to endanger its stability. If, however, a power factor condition which is indicative of an approach to instability is reached, contacts 34 close thereby energizing the relay 26 and resetting the regulator as in Fig. 1.

If it is desired to have the power factor relay assume direct control of the excitation instead of resetting the regulator the manual switch 36 is moved to the right, thereby opening the circuit of the relay 26 and closing the circuit of the relay 37 and of a circuit controlled by the contacts 35 for operating directly the motor-operated rheostat 6 in a raising direction. Therefore, with the switch 36 moved to the right, closure of the contacts 34 prevents the regulator from lowering the excitation and if conditions are further aggravated the contacts 35 will close thereby positively increasing the excitation.

In Fig. 4 the relay 26 is controlled by a switch 38 which is operated by the inlet valve 39 of the prime mover 3. The position of this valve is automatically controlled by a conventional speed governor 40. As the speed tends to decrease with decreases in load on the alternator and as the governor maintains constant speed by automatically opening the inlet valve 39 the position of the valve varies in accordance with the kilowatt load on the alternator. The switch 38 is so arranged that whenever the load reaches a predetermined value, such as normal load or full load or some value therebetween, it will be closed, thereby energizing the relay 26 and resetting the voltage regulator so as automatically to increase the excitation and prevent instability.

While there have been shown and described particular embodiments of this invention, it will be obvious to those skilled in the art that various changes and modification can be made therein without departing from the invention and therefore it is aimed in the appended claims to cover all such changes and modifications as fall within the true spirit and scope of the invention.

What I claim as new and desire to secure by Letters Patent of the United States, is:

1. In combination, a synchronous-to-synchronous electric power system including a prime mover driven alternator, an automatic voltage regulator for varying the excitation of said alternator in response to variations in voltage thereof, and stabilizing means including a variably biased wattmetric relay responsive to the ratio of the kilowatt load on said alternator and the excitation current thereof for changing the setting of said voltage regulator in such a manner as to cause the regulator to increase the excitation sufficiently to prevent loss of synchronism of said alternator whenever said ratio exceeds a predetermined value.

2. In combination, a synchronous-to-synchronous electric power system including a prime mover driven alternator, an automatic voltage regulator for varying the excitation of said alternator in response to variations in voltage thereof in such a manner as normally to maintain said voltage substantially constant, means for raising the setting of said regulator so as to cause it to hold a higher level of voltage, a wattmeter element connected to respond to the kilowatt load on said regulator, a current element responsive to the excitation current of said alternator for opposing said wattmeter element, and means operative when the ratio of kilowatt load to field current exceeds a predetermined value for operating said resetting means.

SELDEN B. CRARY.